(12) United States Patent
Musashi

(10) Patent No.: US 6,891,307 B2
(45) Date of Patent: May 10, 2005

(54) MOTOR WITH A PLURALITY OF POLE TEETH

(75) Inventor: Masayuki Musashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 50 days.

(21) Appl. No.: 10/401,268

(22) Filed: Mar. 27, 2003

(65) Prior Publication Data

US 2003/0193248 A1 Oct. 16, 2003

(30) Foreign Application Priority Data

Mar. 29, 2002 (JP) .................................... 2002-094705

(51) Int. Cl.[7] ............................................... H20K 1/12
(52) U.S. Cl. .................. 310/257; 310/49 R; 310/49 A; 310/259; 310/258; 310/254
(58) Field of Search .............................. 310/257, 49 R, 310/49 A, 259, 258, 254

(56) References Cited

U.S. PATENT DOCUMENTS

| | | | | | |
|---|---|---|---|---|---|
| 4,009,406 A | * | 2/1977 | Inasriba | ...................... | 310/164 |
| 4,695,419 A | * | 9/1987 | Inariba | ...................... | 264/259 |
| 4,820,951 A | * | 4/1989 | Sugirura | ...................... | 310/257 |
| 5,170,082 A | * | 12/1992 | Nakagawa | ................... | 310/45 |
| 6,713,924 B1 | * | 3/2004 | Fukushima | ................. | 310/179 |

* cited by examiner

Primary Examiner—Darren Schuberg
Assistant Examiner—Iraj A. Mohandesi
(74) Attorney, Agent, or Firm—Hogan & Hartson, LLP

(57) ABSTRACT

A motor includes a plurality of core assemblies forming three phases, and a plurality of coil windings provided on the respective core assemblies, wherein one of the coil windings is wound in a coil winding direction opposite to a coil winding direction of the coil windings on other of the coil assemblies, grip sections that are arranged in an axial direction to hold the core assemblies, and pole teeth that connect to at least two of the grip sections on both sides of the center one of the core assemblies and extend from each of the two grip sections in both directions in the axial direction. The pole teeth extending in both directions from each of the two grip sections are arranged along a circumferential direction so as not to overlap one another in the axial direction, and the at each of the grip sections is formed from a single magnetic plate.

17 Claims, 9 Drawing Sheets

| Phase\STEP | 1 | 2 | 3 | 4 | 5 | 6 |
|---|---|---|---|---|---|---|
| A | + | + |   | − | − |   |
| NA | − | − |   | + | + |   |
| B | + |   | − | − |   | + |
| NB | − |   | + | + |   | − |
| C |   | − | − |   | + | + |
| NC |   | + | + |   | − | − |

| STEP<br>Phase | 1 | 2 | 3 | 4 | 5 | 6 |
|---|---|---|---|---|---|---|
| A  | + | + |   | − | − |   |
| NA | − | − |   | + | + |   |
| B  | − |   | + | + |   | − |
| NB | + |   | − | − |   | + |
| C  |   | − | − |   | + | + |
| NC |   | + | + |   | − | − |

MOTOR WITH A PLURALITY OF POLE TEETH

BACKGROUND OF THE INVENTION

1. Field of the Invention

The present invention relates to a motor with a plurality of pole teeth provided circumferentially adjacent to one another.

2. Related Background Art

FIG. 9 shows a motor including core assemblies 5, 6 and 7 that are placed overlapping in the axial direction to form a plurality of phases, wherein the core assemblies 5, 6 and 7 have coils 2, 3 and 4, respectively, that are wound generally cylindrically on a rotation shaft 1.

In the motor having such a structure, the core assemblies 5, 6 and 7 that form three phases are provided with pairs of disk-shaped grip sections $5a$, $5a$, $6a$, $6a$ and $7a$, $7a$, respectively, that grip the coils 2, 3 and 4, respectively, in the axial direction. From the inner circumference end edge sections of the pairs of grip sections $5a$, $5a$, $6a$, $6a$ and $7a$, $7a$ extend pole teeth $5b1$, $5b2$, $6b1$, $6b2$, and $7b1$, $7b2$, respectively, that bend generally perpendicularly in the axial direction towards the counterpart in each grip section pair. The pole teeth $5b$ ($5b1$, $5b2$), $6b$ ($6b1$, $6b2$), and $7b$ ($7b1$, $7b2$) are provided circumferentially adjacent to one another, as indicated in FIG. 10, for example.

However, in a motor having such a structure, of the core assemblies 5, 6 and 7 that form three phases described above, the pair of grip sections $6a$ and $6a$ of the center core assembly 6 provided in the center in the axial direction is provided as a separate body from one of the grip sections $5a$ and of the grip sections $7a$ of the end core assemblies 5 and 7, respectively, that are adjacent to the center core assembly 6. In other words, the grip sections $6a$ and $6a$ of the center core assembly 6 and one of the grip sections $5a$ and of the grip sections $7a$ of the end core assemblies 5 and 7, respectively, are each formed from different members. This is due to the fact that the winding direction of the coils 2, 3 and 4 is set in the same direction in every case, and to the fact that the performance of the motor, which is based on the relationship between the excitation order of the coils according to the winding specification and the rotation direction of the motor, requires that positions and a tooth width dimension of the pole teeth $5b1$ and $6b1$, as well as the pole teeth $6b2$ and $7b1$, that are each bent in a direction opposite to the adjacent core be formed in such a way that the pole teeth within each set overlap each other by generally one-half of a per unit rotation step (half step) in the axial direction, for example. As a result, the adjacent grip sections $6a$ and $5a$, and the adjacent grip sections $6a$ and $7a$, cannot be manufactured from a single member.

In conventional motors, the grip sections $6a$ and $6a$ of the center core assembly 6 and one of the grip sections $5a$ and of the grip sections $7a$ of the end core assemblies 5 and 7, respectively, adjacent to the center core assembly 6 are forced to have a structure that forms one set from two pieces, as shown in FIGS. 11 and 12; this has resulted in higher manufacturing cost for the core assemblies and a difficulty in achieving a motor that is thinner in the axial direction.

SUMMARY OF THE INVENTION

In view of the above, the present invention relates to a motor that is inexpensive yet compact through a simple and inexpensive structure for core assemblies.

In order to solve the problem, a motor in accordance with an embodiment of the present invention includes a plurality of core assemblies forming three or more phases; a plurality of coil windings provided on the respective core assemblies, wherein one of the coil windings is wound in a coil winding direction opposite to a coil winding direction of the coil windings on other of the coil assemblies; grip sections that are arranged in an axial direction to hold the core assemblies; and pole teeth extending from at least one of the grip sections in both directions in the axial direction, wherein the pole teeth do not overlap one another in the axial direction, and the at least one of the grip sections is formed from a single magnetic plate.

Due to the fact that the winding direction of the coil provided in one of the core assemblies that form three or more phases is set in a direction opposite to the winding direction of the coils provided in the other core assemblies, the pole teeth, which extend from the grip sections placed between the core assembly whose coil winding direction is set in the direction opposite to others and the adjacent core assemblies in the axial direction in both directions in the axial direction towards counterpart grip sections that form pairs with the grip sections, can be formed in positions and in a tooth width dimension that do not cause them to overlap one another in the axial direction. As a result, each of the grip sections placed between the core assembly whose coil winding direction is set in the direction opposite to others and the core assemblies adjacent to it in the axial direction can be formed from a single magnetic plate. Consequently, the structure of the core assemblies, and especially of the grip sections, can be made simple and thin.

A motor in accordance with another embodiment of the present invention includes a center core assembly and end core assemblies provided on both sides of the center core assembly which form three phases; a center coil winding provided on the center core assembly and end coil windings provided on the respective end core assemblies, wherein the center coil winding is wound in a coil winding direction opposite to a coil winding direction of the end coil windings on the end coil assemblies; grip sections that are arranged in an axial direction to hold the core assemblies; and pole teeth on both sides of the center core assembly extending from the grip sections in both directions in the axial direction towards the counterpart grip sections that form pairs with the grip sections, wherein the pole teeth do not overlap one another in the axial direction, and each of the grip sections is formed from a single magnetic plate.

Due to the fact that the winding direction of the center coil provided in the center core assembly placed in the center part in the axial direction of core assemblies forming three phases is set in a direction opposite to the winding direction of end coils provided in end core assemblies placed at end parts in the axial direction, pole teeth, which extend in both direction in the axial direction towards the counterpart grip sections that form pairs with the grip sections from grip sections provided between the center core assembly and the end core assemblies, can be formed in positions and in a tooth width dimension that do not cause them to overlap with one another in the axial direction. As a result, each of the grip sections provided between the center core assembly and the end core assemblies can be formed from a single magnetic plate. Accordingly, the structure of the core assemblies, and especially of the grip section, can be made simple and thin.

Other features and advantages of the invention will be apparent from the following detailed description, taken in conjunction with the accompanying drawings that illustrate, by way of example, various features of embodiments of the invention.

PREFERRED EMBODIMENTS

Next, preferred embodiments that apply the present invention to stepping motors will be described with reference to the accompanying drawings.

Figure 1:
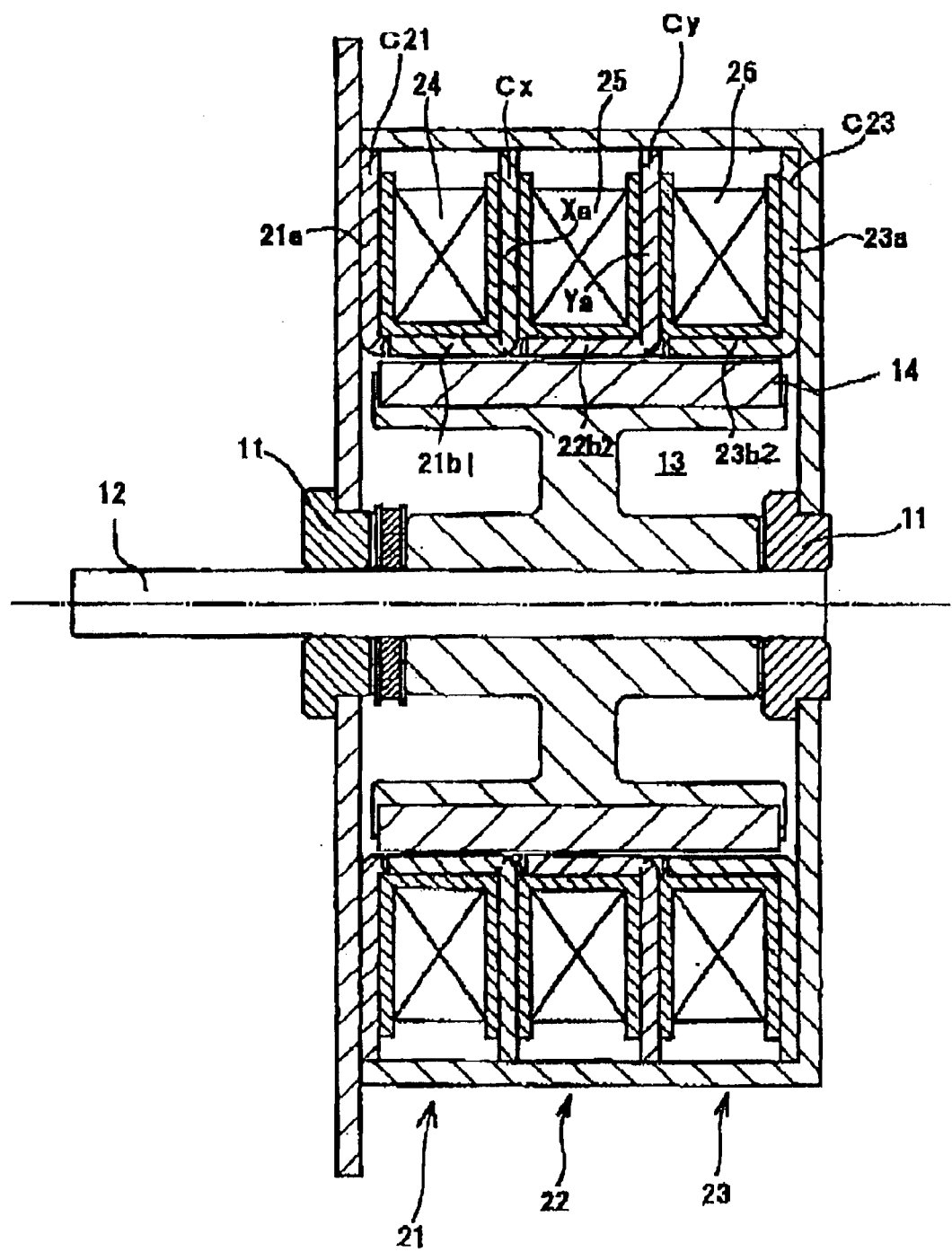
FIG. 1 is a cross-sectional view illustrating the structure of a three-phase stepping motor in accordance with one embodiment of the present invention.

First, as shown in FIG. 1, a stepping motor includes a pair of bearing members 11 provided in a stator section, and a rotation shaft 12 that is supported in a freely rotatable manner by the bearing members 11. A rotor section 13 that is formed in a generally cylindrical shape is mounted on the rotation shaft 12. A rotor magnet 14 is mounted in a ring-shaped manner on the outer circumference surface of the rotor section 13. In close proximity on the outer circumference side of the rotor magnet 14 are core assemblies 21, 22 and 23 of the stator section provided overlapping and adhering to each other in the axial direction to form three phases in the axial direction. The core assemblies 21, 22 and 23 are provided with coils 24, 25 and 26, respectively, wound cylindrically around the rotation shaft 12.

Hereafter, the core placed in the center part in the axial direction of the three core assemblies 21, 22 and 23 that form three phases is called the center core assembly 22, while the cores provided on either side of the center core assembly 22 and adjacent to it in the axial direction are called the end core assemblies 21 and 23. Further, the coil 25 wound around in the center core assembly 22 is called a center coil, while the coils 24 and 26 wound around in the end core assemblies 21 and 23, respectively, are called end coils.

Against the center coil 25 provided in the center core assembly 22 is placed a pair of cores Cx and Cy to be in contact with the center coil 25 from either side in the axial direction, while against the end coil 24 of the end core assembly 21 on the left in FIG. 1 is placed a pair of cores C21 and Cx to be in contact with the end coil 24 from either side in the axial direction. Similarly, against the end coil 26 of the end core assembly 23 on the right in FIG. 1 is placed a pair of cores Cy and C23 to be in contact with the end coil 26 from either side in the axial direction.

Next, the structure of the cores C21, Cx, Cy and C23 will be describe in further detail. The cores Cx and Cy that form the center core assembly 22 have grip sections Xa and Ya, respectively, that form a pair with each other, that are disk-shaped and that are placed to interpose the center coil 25 in the axial direction. The core C21 that comprises the end core assembly 21 has a disk-shaped grip section 21a that is placed to interpose the end coil 24 in the axial direction from the shaft-end side of the rotation shaft 12. Similarly, the core C23 that comprises the end core assembly 23 has a disk-shaped grip section 23a that is placed to interpose the end coil 26 in the axial direction from the shaft-end side of the rotation shaft 12. The grip section 21a and the grip section Xa form a pair, and the grip section 23a and the grip section Ya form another pair.

From the grip section Xa are formed pole teeth 22b1 and 21b1 that extend in either direction in the axial direction towards the grip section Ya and the grip section 21a, respectively, that form pairs with the grip section Xa. In other words, a plurality of pole teeth 22b1, which extends in the axial direction and bends generally perpendicularly towards the grip section Ya, and a plurality of pole teeth 21b1, which extends in the axial direction and bends generally perpendicularly towards the grip section 21a, are formed from the inner circumference edge of the grip section Xa. Further, from the grip section Ya are formed pole teeth 22b2 and 23b1 that extend in either direction in the axial direction towards the grip section Xa and the grip section 23a, respectively, that form pairs with the grip section Ya. In other words, a plurality of pole teeth 22b2, which extends in the axial direction and bends generally perpendicularly towards the grip section Xa, and a plurality of pole teeth 23b1, which extends in the axial direction and bends generally perpendicularly towards the grip section 23a, are formed from the inner circumference edge of the grip section Ya. Moreover, a plurality of pole teeth 21b2 that extends in the axial direction and bends generally perpendicularly towards the grip section Xa is formed from the inner circumference edge of the grip section 21a, and a plurality of pole teeth 23b2 that extends in the axial direction and bends generally perpendicularly towards the grip section Ya is formed from the inner circumference edge of the grip section 23a.

Figure 2:
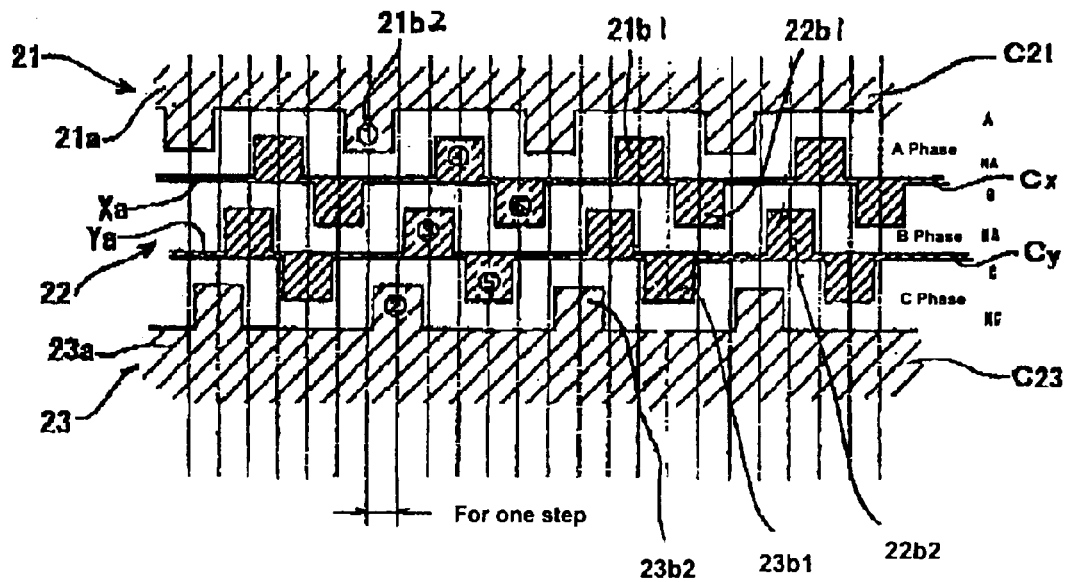
FIG. 2 is a developed view of the placement of pole teeth of each core assembly in the stepping motor shown in FIG. 1.

By having each of the plurality of pole teeth 21b (21b1, 21b2), 22b (22b1, 22b2) and 23b (23b1, 23b2) extend close to the counterpart grip section with which it form a pair, the pole teeth are provided circumferentially adjacent to one another with the rotation shaft 12 as the center. When the salient pole 21b2 is considered the reference, the pole teeth are provided adjacent to one another in a repeating manner in the rotating direction (towards the right in FIG. 2) in the circumferential direction to overlap each other by generally one-half of a per unit rotation step (half step) in the circumferential direction in the order of 21b2, 23b2, 22b2, 21b1, 23b1, 22b1, 21b2, etc. In other words, each of the pole teeth 21b2, 23b2, 22b2, 21b1, 23b1 and 22b1 has a pitch corresponding to one step and a tooth width dimension of generally 1.5 steps. The pole teeth are structured to overlap each other by generally one-half step in the circumferential direction to allow the rotor to rotate smoothly.

Figure 10:
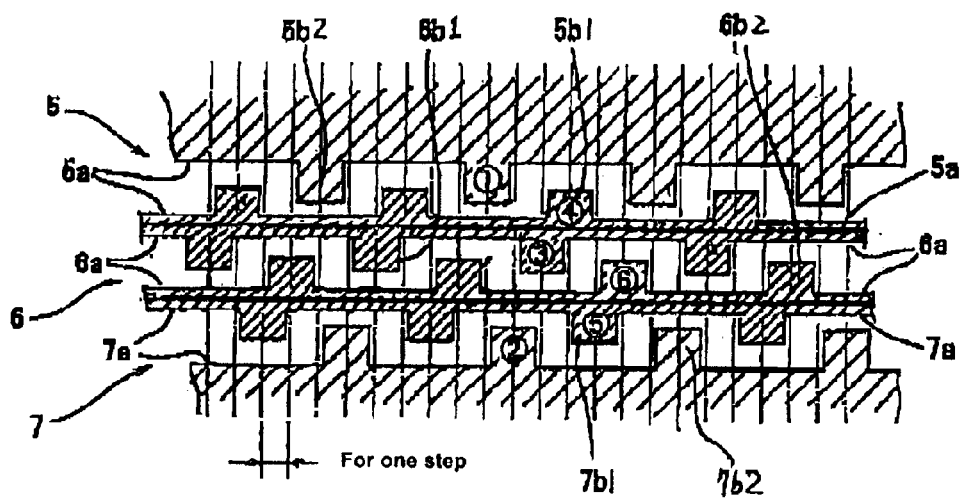
FIG. 10 shows a developed view of the placement of pole teeth in the stepping motor shown in FIG. 9.
Figure 11:
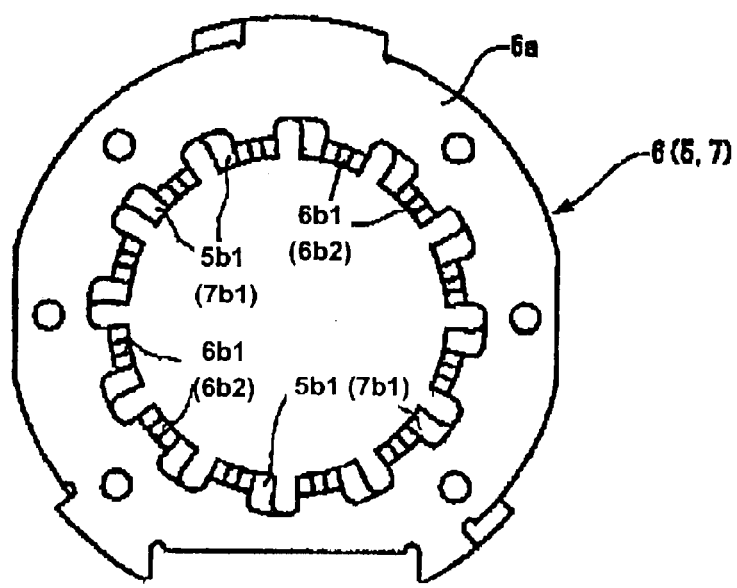
FIG. 11 shows an enlarged front view of the structure of core assemblies of the general stepping motor shown in FIG. 9.

The winding directions of the center coil 25 and of the end coils 24 and 26, which are wound around in the three core assemblies 22, 21 and 23, respectively, that form three phases are different from conventional motors in which all coils are wound in the same direction. More specifically, the winding direction of the center coil 25 provided in the center core assembly 22 is set in a direction opposite to the winding direction of the end coils 24 and 26 provided in the end core assemblies 21 and 23, respectively. In the present embodiment, to correspond to the winding direction of the center coil 25 set in the direction opposite to others, the positions of a pair of pole teeth provided in the center core assembly of a conventional motor (see 6b1 and 6b2 in FIG. 10) are switched, while the positions of pole teeth provided in end cores of the conventional motor (see 5b1, 5b2, and 7b1, 7b2 in FIG. 10) remain unchanged, as described in detail below.

More specifically, the pole teeth 22b1 and 22b2 provided in the center core assembly 22 are positioned to be displaced in the circumferential direction by a distance equivalent to generally two per unit rotation steps (2 steps) from the pole teeth 21b1 and 23b1, respectively, provided on the side closer to the center core assembly 22 in the end core assemblies 21 and 23, respectively, adjacent to the center core assembly 22 in the axial direction. Further, the tooth width dimension is generally 1.5 steps. As a result, the pole teeth 22b1 and 21b1, which extend in either direction in the axial direction towards the grip section Ya and the grip section 21a, respectively, that each forms a pair with the grip section Xa of the core Cx provided between the center core assembly 22 and the end core assembly 21, are formed in positions and in the tooth width dimension that do not cause them to overlap with each other in the axial direction. Similarly, the pole teeth 22b2 and 23b1, which extend in either direction in the axial direction towards the grip section Xa and the grip section 23a, respectively, that each forms a pair with the grip section Ya of the core Cy provided between the center core assembly 22 and the end core assembly 23, are formed in positions and in the tooth width dimension that do not cause them to overlap with each other in the axial direction.

Figure 3:
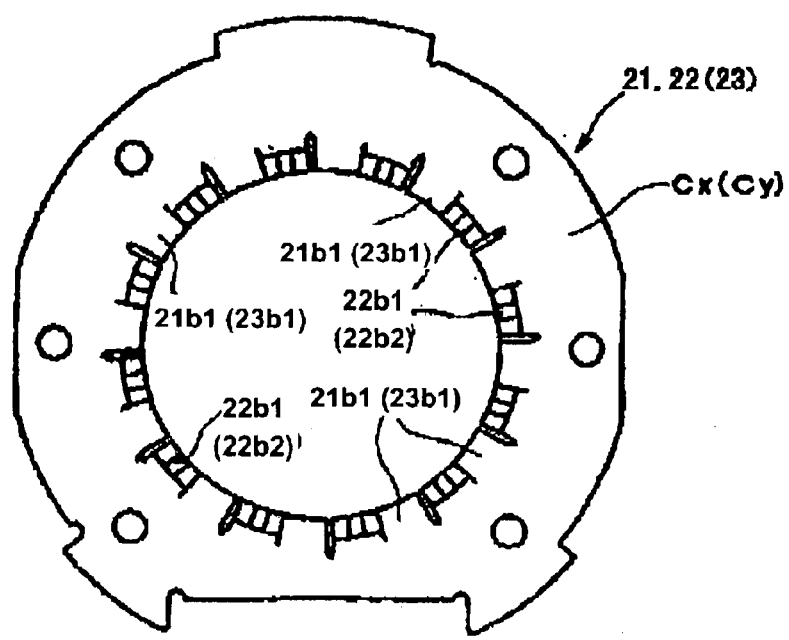
FIG. 3 is an enlarged front view of the structure of the core assemblies of the stepping motor shown in FIG. 1.
Figure 4:
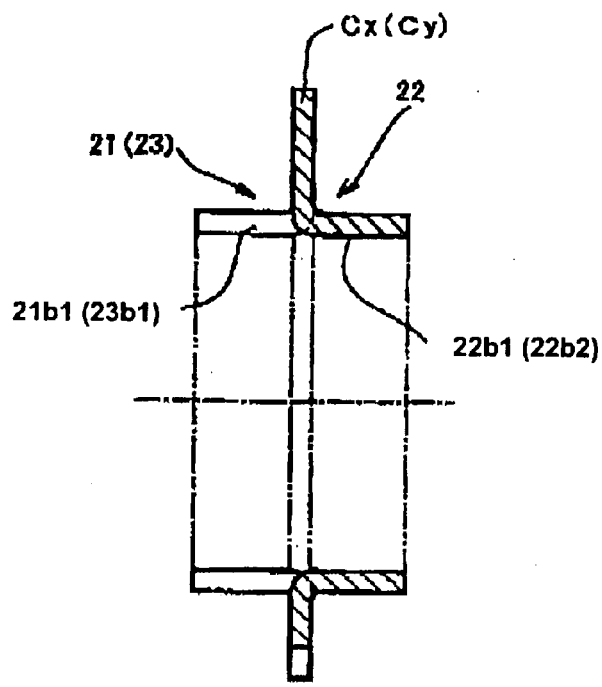
FIG. 4 is an enlarged side view of the structure of the core assemblies of the stepping motor shown in FIG. 1.

Due to the fact that the pole teeth 22b1 and 21b1, and the pole teeth 22b2 and 23b1, are positioned to avoid overlapping with each other in the axial direction, of the three core assemblies 21, 22 and 23 that form three phases, the pair of grip sections Xa and Ya that comprise the center core assembly 22 provided in the center part in the axial direction, and the grip sections Xa and Ya on one side of the end core assemblies 21 and 23, respectively, provided adjacent to the center core assembly 22 in the axial direction can be formed from a single magnetic plate, as shown in FIGS. 3 and 4, without any decline in the motor performance.

That is, compared to the conventional core assemblies (see FIG. 10), each salient pole 22b1 of the center core assembly 22, or a B phase, is displaced by three steps in the rotating direction (to the right in FIG. 2) of the rotor, described later, and each salient pole 22b2 is displaced by three steps in the counter-rotating direction (to the left in FIG. 2) of the rotor. Through such a structure, the pole teeth 22b1 and 21b1, and the pole teeth 22b2 and 23b1, that extend in either direction in the axial direction from the grip sections Xa and Ya, respectively, are formed in positions and in a tooth width dimension that do not cause them to overlap with each other in the axial direction; consequently, the pair of grip sections Xa and Ya of the center core assembly 22 and the grip sections Xa and Ya on one side of the end core assemblies 21 and 23, respectively, can be formed from a single, shared magnetic plate. Excitation according to the present embodiment takes place in the order of the pole teeth indicated by circled numbers in FIG. 2, and the rotation direction is the same as in conventional core assemblies.

Figure 5:
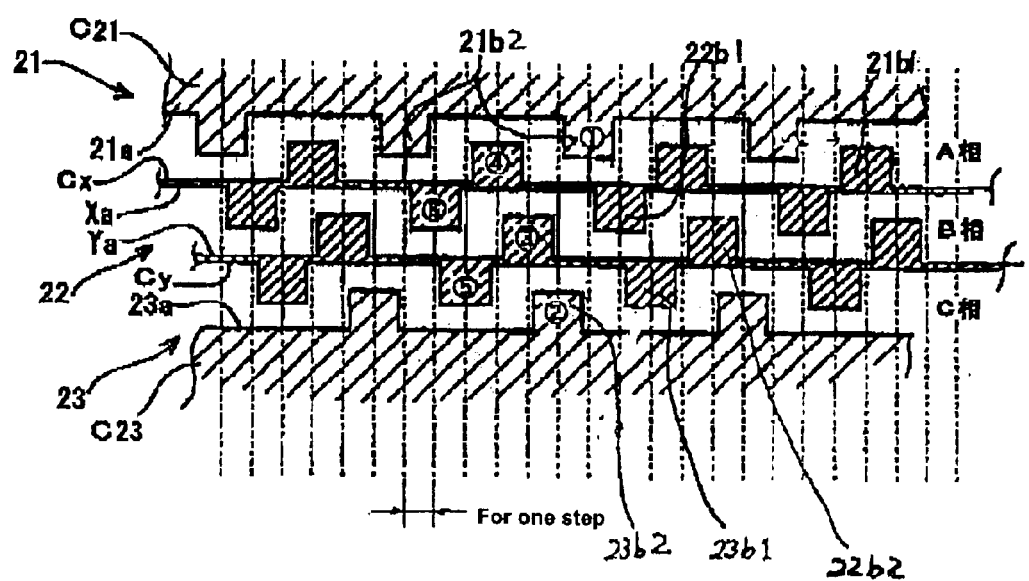
FIG. 5 is a developed view of the placement of pole teeth of each core assembly in a stepping motor in another embodiment of the present invention.

In another embodiment shown in FIG. 5, pole teeth 21b1, 21b2, 22b1, 22b2, 23b1 and 23b2 described above are arranged such that one salient pole from among these pole teeth becomes a center from which point other pole teeth are placed in symmetrical positions in the circumferential direction. For example, with the salient pole marked ① in FIG. 2 as the center, the pole teeth marked ④, ⑥, ③, ⑤ and ② from the top of the drawing are placed in symmetrical positions in the circumferential direction. Comparing this to the conventional one (see FIG. 10), the pole teeth 22b1 and 22b2 in a center core assembly 22, or a B phase, are each displaced by one step in the rotating direction (to the left in FIG. 5) of the rotor, described later. The pole teeth 23b1 and 23b2 of an end core assembly 23, or a C phase, are each displaced by two steps in the rotating direction (to the left in FIG. 5) of the rotor, described later. Through such a structure, the pole teeth 22b1 and 21b1, and the pole teeth 22b2 and 23b1, that extend in either direction in the axial direction from grip sections Xa and Ya, respectively, are formed in positions and in a tooth width dimension that do not cause them to overlap one another in the axial direction. Consequently, the pair of grip sections Xa and Ya of the center core assembly 22 and the grip sections Xa and Ya on one side of the end core assemblies 21 and 23, respectively, can be each formed from a single, common magnetic plate.

Figures 6, 7:
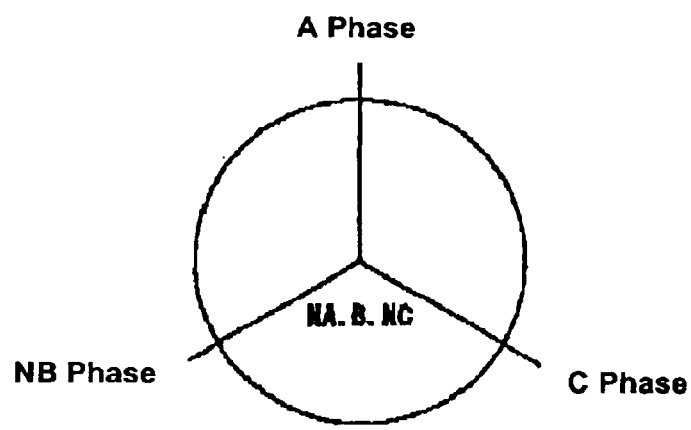
FIG. 6 shows a pattern diagram illustrating the coil connection of the stepping motor shown in FIG. 5.
FIG. 7 shows a table indicating the excitation order for the coil connection shown in FIG. 6.
Figure 8:
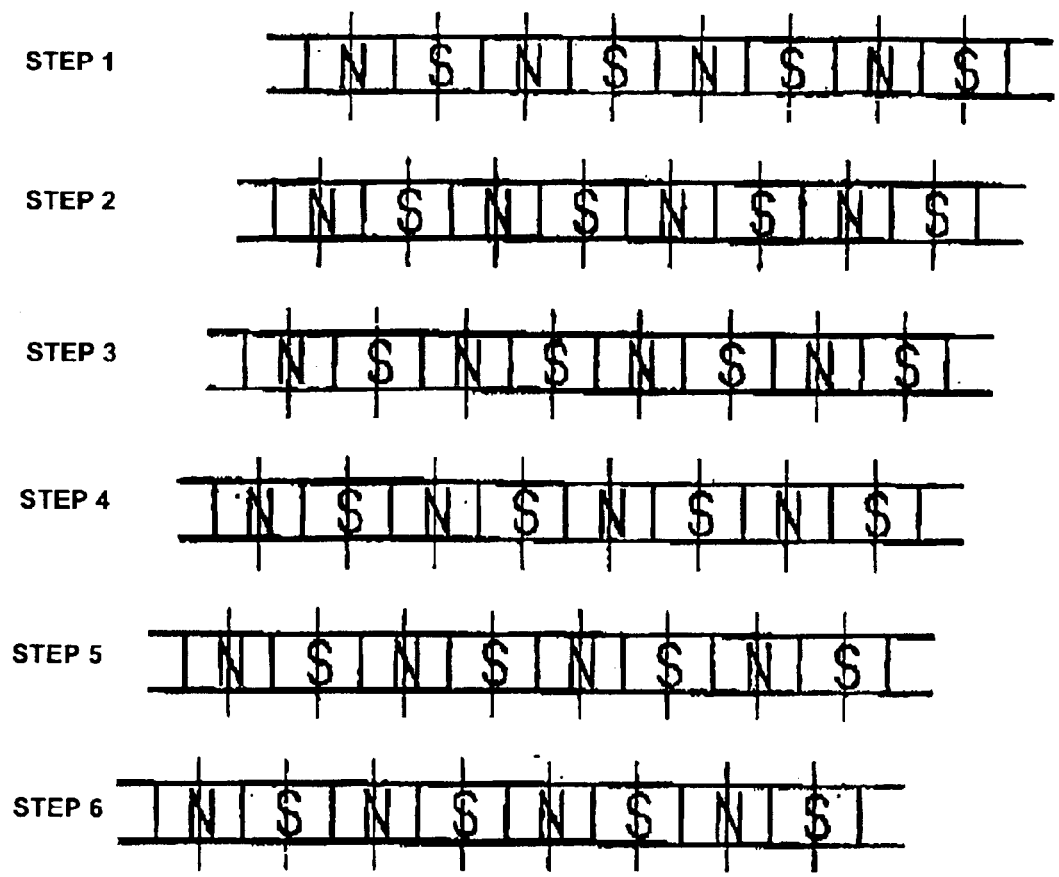
FIG. 8 shows a diagram illustrating the timing of excitation according to the excitation order in FIG. 7.
Figure 9:
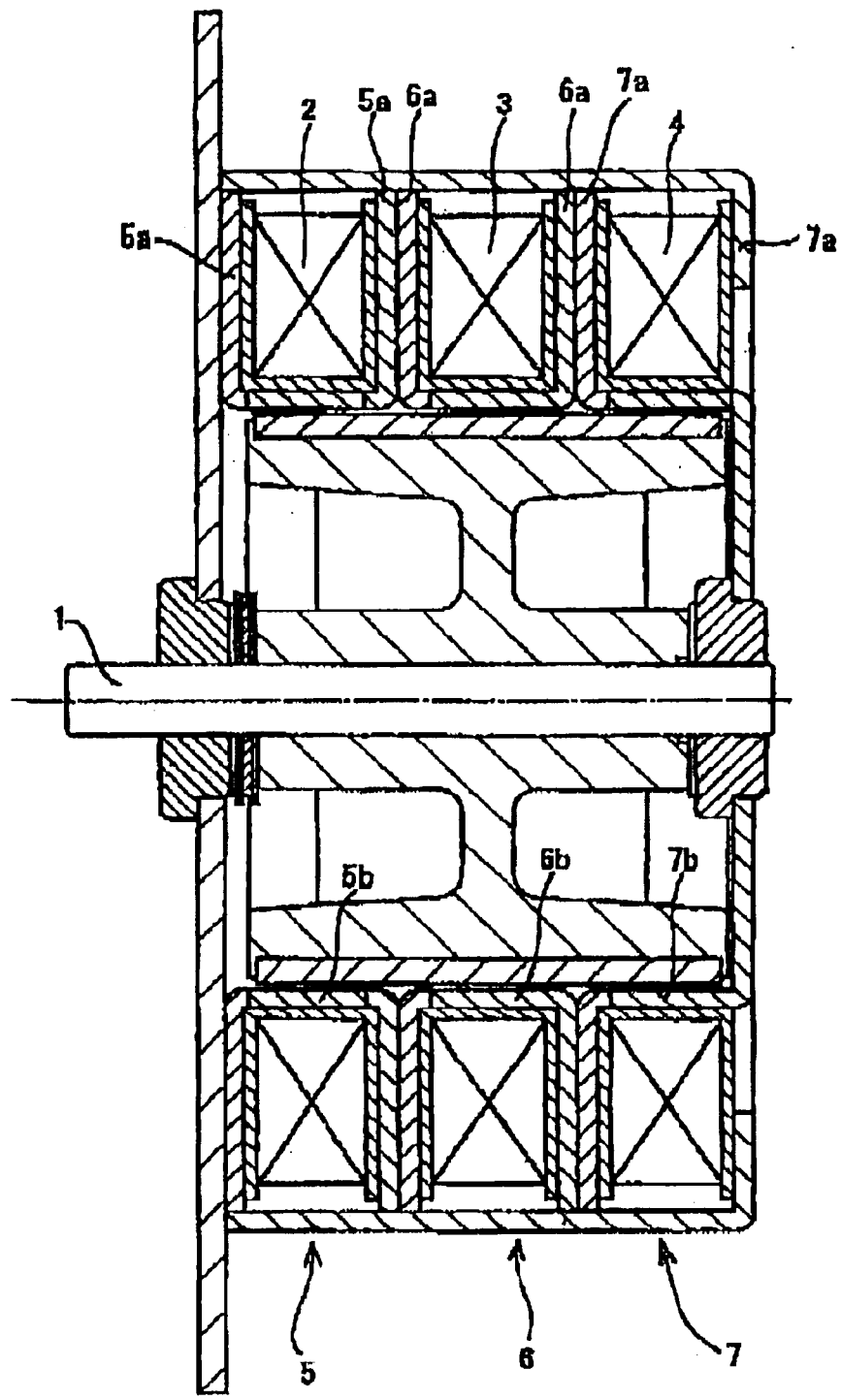
FIG. 9 shows a cross-sectional view of the structure of a general stepping motor.
Figures 12, 13:
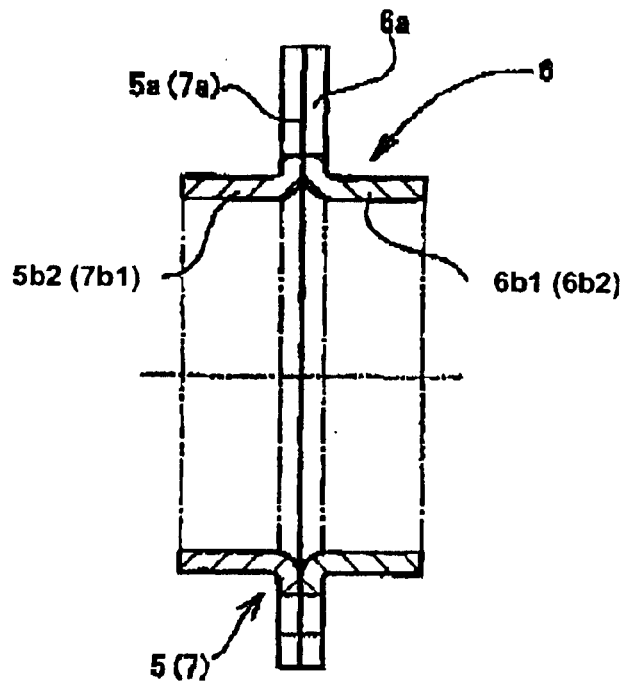
FIG. 12 shows an enlarged side view of the structure of the core assemblies of the general stepping motor shown in FIG. 9.
FIG. 13 shows a table indicating the excitation order for the general stepping motor.
Figure 14:
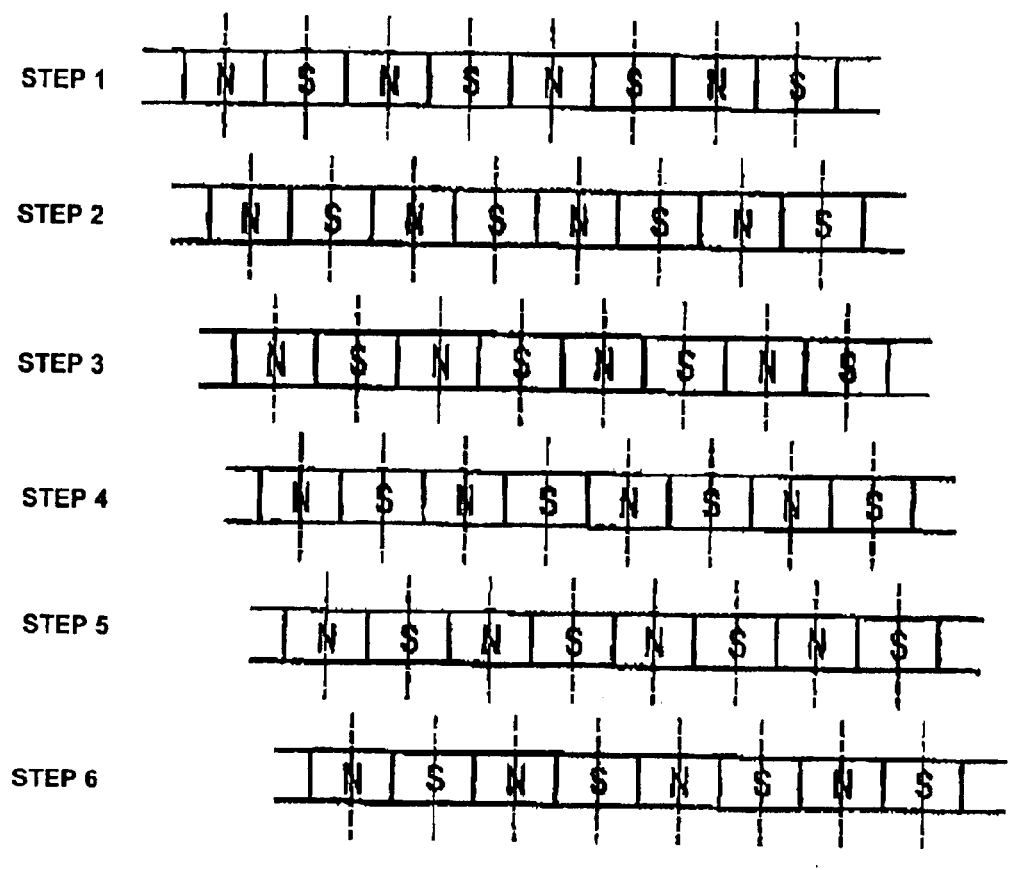
FIG. 14 shows a diagram illustrating the timing of excitation according to the excitation order in FIG. 13.

In the meantime, in the core assemblies 21, 22 and 23 having such a structure, two-phase excitation is performed in the order indicated in table 7 on the coils 24, 25 and 26 of phases A, B and C, respectively, having a common connection (Y connection), as shown in FIG. 6, so that the pole teeth are excited in the order of circled numbers in FIG. 5. This excitation order applies when the winding direction of the B phase coil is set in a direction opposite to those of ordinary motors, so that compared to the excitation order for ordinary motors shown in FIG. 13, the direction of the current that flows from the positive side is set to be in the opposite direction when appropriate. In this case, excitation in the rotating direction of the rotor is counter-clockwise and appears as indicated in FIG. 8, for example, which is in the opposite direction to the rotating direction of general motors indicated in FIG. 14.

As described above, according to a motor in the present embodiment, by having the pole teeth 22b1 and 21b1, and the pole teeth 22b2 and 23b1, that extend in either direction in the axial direction from the grip sections Xa and Ya, respectively, formed in positions and in the tooth width dimension that do not cause them to overlap one another in the axial direction, each of the grip sections Xa and Ya of the adjacent core assemblies can be formed in one piece. As a result, the structure of the core assemblies 21, 22 and 23 can be made significantly simpler and thinner than in conventional motors.

Preferred embodiments of the present invention have so far been described, but many modifications can be made without departing from the present invention.

For example, each of the embodiments described above applies the present invention to a three-phase stepping motor, but the present invention can be similarly applied to stepping motors with more than three phases and to motors with three or more phases having various structures other than stepping motors.

Furthermore, although each of the embodiments described above applies the present invention to an inner rotor-type motor, the present invention can be similarly applied to outer rotor-type motors.

As described above, in a motor according to the present invention, the structure of core assemblies is made simple and thin by forming from a single magnetic plate a core assembly, whose coil winding direction is set in a direction opposite to others by having the winding direction of the coil provided in the core assembly of a plurality of core assemblies forming three or more phases set in a direction opposite to the winding direction of coils provided in other coil assemblies, and grip sections, which are provided in cores placed between the core assembly and the core assemblies adjacent to it in the axial direction and whose pole teeth extend from the grip sections in either direction in the axial direction in such a way that the pole teeth do not overlap with each other in the axial direction; consequently, the motor can be made inexpensively and compactly, which allows an extremely useful motor to be obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a plurality of core assemblies forming three or more phases;
   a plurality of coil windings provided on the respective core assemblies; wherein one of the coil windings is wound in a coil winding direction opposite to a coil winding direction of the coil windings on other of the coil assemblies;
   grip sections that are arranged in an axial direction to hold the core assemblies; and
   wherein one of the grip sections positioned between two of the coil windings is formed from a single magnetic plate and includes pole teeth extending axially away from each other and not overlapping in the axial direction.

2. A motor according to claim 1, wherein each of the grip sections is in a circular plate shape having an inner circumferential edge section, and the pole teeth extend in the axial direction from the inner circumferential edge section of the circular plate.

3. A motor according to claim 1, further comprising a rotation shaft encircled by the plurality of core assemblies wherein each of the grip sections is in a circular plate shape having an inner circumferential edge section adjacent to the rotation shaft in a radial direction, and the pole teeth connecting to the each of the grip sections extend in the axial direction from the inner circumferential edge section of the circular plate.

4. A motor according to claim 2, wherein the each of the grip sections and the pole teeth provided at the each of the grip sections are formed from a single plate.

5. A motor according to claim 2, wherein another of the grip sections is formed from another single magnetic plate, the one and the another of the grip sections being provided on both sides of the one of the coil windings wound in the coil winding direction opposite to the coil winding direction of the coil windings on other of the coil assemblies.

6. A motor comprising:
   a plurality of core assemblies forming three or more phases;
   a plurality of coil windings provided on the respective core assemblies, wherein one of the coil windings is wound in a coil winding direction opposite to a coil winding direction of the coil windings on other of the coil assemblies;
   grip sections that are arranged in an axial direction on both sides of at least one of the core assemblies; and
   wherein one of the grip sections positioned between two of the coil windings is formed from a single magnetic plate and includes pole teeth extending axially away from each other and not overlaping in the axial direction.

7. A motor according to claim 6, wherein each of the grip sections is formed from a single magnetic plate.

8. A motor according to claim 7, wherein the each of the grip sections and the pole teeth connecting to the each of the grip sections are formed from a single magnetic plate.

9. A motor according to claim 7, wherein the each of the grip sections is in a circular plate shape having an inner circumferential edge section, and the pole teeth extend in the axial direction from the inner circumferential edge section of the circular plate.

10. A motor comprising:
    three or more core assemblies disposed adjacent to one another in an axial direction, each of the core assemblies having a coil wound in a cylindrical shape around a rotor member as a center of rotation;
    at least one pair of grip sections that are arranged in the axial direction to hold one of the core assemblies, each of the pair of grip sections having an inner circumferential edge section adjacent to the rotor member; and
    wherein each of the grip sections is formed from a single magnetic plate and includes pole teeth extending axially away from each other and not overlapping in the axial direction.

11. A motor according to claim 10, wherein the coil provided on the one of the core assemblies held by the at least one pair of grip sections is wound in a coil winding direction that is opposite to a coil winding direction of the coil windings on other of the core assemblies.

12. A motor according to claim 10, wherein each of the grip sections is in a circular disk shape.

13. A motor according to claim 12, wherein the coil provided on the one of the core assemblies held by the at least one pair of grip sections is wound in a coil winding direction that is opposite to a coil winding direction of the coil windings provided on other of the core assemblies.

14. A motor according to claim 10, wherein each of the grip sections and the pole teeth extending from each of the grip sections are formed from a single magnetic plate.

15. A motor according to claim 10, wherein the pole teeth extending axially away from each other are formed in positions along a circumferential direction of the corresponding grip section and in a tooth width dimension which avoids overlapping one another in the axial direction.

16. A motor comprising:
    a center core assembly and two end core assemblies disposed on both sides of the center core assembly and adjacent to one another in an axial direction for forming three phases, each of the core assemblies having a coil winding wound in a cylindrical shape around a rotor member as a center of rotation;

grip sections that are arranged in the axial direction to hold the center core assembly and the end core assemblies, wherein two of the grip sections hold the center core assembly, each of the two of the grip sections being formed from a single magnetic plate and including pole teeth extending axially away from each other and not overlapping in the axial direction; and wherein the coil provided on the center core is wound in a coil winding direction that is opposite to a coil winding direction of the coil windings provided on the end core assemblies.

17. A motor according to claim 16, wherein each of the two grip sections and the pole teeth extending from the each of the two grip sections are formed from a single magnetic plate.

* * * * *